United States Patent [19]
Mercke et al.

[11] Patent Number: 5,834,921
[45] Date of Patent: Nov. 10, 1998

[54] SAFETY DEVICE FOR A PORTABLE BATTERY-POWERED ELECTRIC APPARATUS

[75] Inventors: Johan Mercke; Björn Frännhagen, both of Lund, Sweden

[73] Assignee: Telefonaktiebolaget LM Ericsson, Sweden

[21] Appl. No.: 886,535

[22] Filed: Jul. 1, 1997

[51] Int. Cl.⁶ .................................................. H02J 7/00
[52] U.S. Cl. ............... 320/112; 320/128; 320/DIG. 13; 320/134; 320/150; 320/154; 307/66; 361/104; 361/103; 361/106
[58] Field of Search .................... 320/150, 154, 320/134, 112, 116, DIG. 13, 128; 361/104, 103, 106; 307/66, 67

[56] References Cited

U.S. PATENT DOCUMENTS

| | | | |
|---|---|---|---|
| 3,714,452 | 1/1973 | Williamson | 307/86 |
| 4,075,504 | 2/1978 | Gnaedinger | 307/66 |
| 4,255,698 | 3/1981 | Simon | 320/134 |
| 4,346,636 | 8/1982 | Crawford | 321/154 |
| 4,413,301 | 11/1983 | Middleman et al. | 361/106 |
| 4,475,138 | 10/1984 | Middleman et al. | 361/106 |
| 4,555,451 | 11/1985 | Harrod et al. | |
| 4,563,628 | 1/1986 | Tietz et al. | |
| 4,578,628 | 3/1986 | Siwiak | |
| 4,916,594 | 4/1990 | Headley | |
| 5,146,150 | 9/1992 | Gyenes et al. | |
| 5,206,782 | 4/1993 | Landmeier et al. | 307/66 |
| 5,367,280 | 11/1994 | Thiel et al. | |
| 5,585,994 | 12/1996 | Tamai et al. | 361/98 |
| 5,619,076 | 4/1997 | Layden et al. | 307/48 |
| 5,680,027 | 10/1997 | Hiratsuka et al. | 320/134 |
| 5,703,463 | 12/1997 | Smith | 320/DIG. 13 |
| 5,717,314 | 2/1998 | Wakefield | 320/150 |

FOREIGN PATENT DOCUMENTS

| | | |
|---|---|---|
| 553 824 | 8/1993 | European Pat. Off. |
| 2 239 567 | 7/1991 | United Kingdom |
| WO96/36098 | 11/1996 | WIPO |

*Primary Examiner*—Peter S. Wong
*Assistant Examiner*—K. Shin
*Attorney, Agent, or Firm*—Burns, Doane, Swecker & Mathis, L.L.P.

[57] ABSTRACT

A safety device for a portable battery-powered electric apparatus having a battery unit with one or more battery cells for supplying power to electric circuitry in the apparatus. The apparatus is connectable to a charging device for charging the battery unit while maintaining the supply of power to the apparatus. The safety device has a first fuse device connected between the battery unit and a first terminal of the apparatus for receiving charging current from the charging device, and a second fuse device connected between the battery unit and a second terminal of the apparatus for supplying power to electric circuitry in the apparatus. The fuse devices are operatively independent of each other, particularly in that the second fuse device maintains the electric connection between the battery unit and the electric circuitry in the apparatus, even when or if the first fuse device releases or opens in response to an undesired condition in the charging device.

8 Claims, 3 Drawing Sheets

5,834,921

SAFETY DEVICE FOR A PORTABLE BATTERY-POWERED ELECTRIC APPARATUS

TECHNICAL FIELD

The present invention relates to a safety device for a portable battery-powered electric apparatus, the apparatus comprising a battery unit for supplying power to electric circuitry in the apparatus and being connectable to a charging device for charging the battery unit while maintaining the power supply of the apparatus.

BACKGROUND

Rechargeable batteries are used in various portable applications, such as cellular telephones, communication radio devices, laptop computers, videocameras, etc. Throughout this document the discussion and description will relate to the first example above, i.e. cellular telephones. However, this does not limit the invention to cellular telephones only; on the contrary, a man skilled in the art will realize, when considering the description below, that the invention may be applied in various related technical fields.

In the applications above a rechargeable battery consists of a plurality (preferably 2–5) of battery cells, which are connected in series so as to provide an external supply voltage of between, for instance, 3 and 6 volts, as desired. Such a battery unit comprises additional components, such as connection terminals, contact tabs, battery housing and fuses. Conventionally, NiCd (nickel-cadmium) battery cells have been frequently used, but recently NiMH (nickel-metal hydride) cells and Li cells (lithium-iron, lithium-polymer) have become more common. Regardless of the battery type, and for reasons of comfort, the battery may often be connected to a charging device for supplying charging current thereto, without having to remove the battery from e.g. the cellular telephone. Furthermore, due to user demands the battery may usually be charged without having to turn off the cellular telephone or remove it from service.

FIG. 1 discloses a schematic block diagram for a charging arrangement according to the prior art. A number of battery cells 13a, 13b (in this case: two battery cells) are according to above connected in series and constitute a battery unit 12. The battery unit 12 is arranged to supply power to a cellular telephone 11, which may be chosen from any of the models available on the market and which is hence schematically indicated only by a dashed line. The cellular telephone comprises various electric and electronics circuits and components, such as power amplifiers, microprocessor, filter circuits, local oscillators, etc. The presence of these circuits and components is obvious to a man skilled in the art, and hence the components are only represented by a common block of electronics 14.

The battery unit 12 has two connections: a positive terminal and a negative terminal. To protect the battery the battery cells 13a, 13b are connected in series with a fuse 18, which will normally be resetable.

A charging device 16 is arranged to be attached via connections in the telephone 11 to the battery unit 12 for charging purposes. As appears from the drawing, the battery may be charged while the mobile telephone 11 is maintained in operation, which according to the above is a common user demand. A major disadvantage of a charging arrangement according to FIG. 1 is that if the charging device for some reason would supply an excessively strong charging current to the battery unit 12, wherein the fuse 18 would open as a consequence thereof, then the voltage across the block of electronics 14 in the mobile telephone would rise to a dangerously high level, where the circuits and components in the block 14 may be damaged or completely destroyed. For this reason at least one additional fuse 19a and 19b, respectively, (or some other kind of suitable protection means) is required inside the charging device 16 and the mobile telephone 11, respectively. Such multiple-fuse safety arrangements require additional space and lead to an increase in manufacturing costs.

FIG. 2 illustrates a fuse 18 according to the prior art. A thin layer of an active material 17 is interposed between two metallic contact tabs 15a, 15b. The active material 17 consists of a polymeric material and comprises thin carbon fibres, which normally conduct electric current between the contact tabs 15a, 15b. When the magnitude of the current increases due to an electric fault, the generation of heat in the active material 17 will increase as a consequence. The rising temperature in the material causes an expansion of the material, wherein the carbon fibres will separate and interrupt the electric connection between the contact tabs. The fuse is automatically resetable, since the carbon fibres will regain contact, once the material has cooled down.

Previously known battery units are shown in for instance GB-A-2 239 567, U.S. Pat. Nos. 4,578,628, 4,916,594 and 4,555,451. Examples of useful fuses are found in U.S. Pat. Nos. 4,563,628, 5,367,280 and 5,146,150, among others.

SUMMARY

The object of the present invention is to provide effective and reliable charging of the battery unit in a portable electric apparatus, such as a cellular telephone, with a minimum of components and at a low cost of material. The invention is particularly aimed at eliminating the risk of damaging the electronics comprised in the apparatus due to an excessively high supply voltage, when the charging process deviates from the normal situation, for instance due to the release of a fuse in the battery unit.

The object is achieved by a safety device that includes a first fuse device, which is arranged to be connected between a battery and a first terminal of an apparatus powered by the battery for receiving charging current from a charging device, and a second fuse device, which is arranged to be connected between the battery and a second terminal of the apparatus for supplying power to electric circuitry in the apparatus. The first and second fuse devices are operatively independent of each other, particularly in that the second fuse device maintains the electric connection between the battery and the electric circuitry in the apparatus, even when or if the first fuse device releases or opens in response to an undesired condition in the charging device.

BRIEF DESCRIPTION OF THE DRAWINGS

The invention will now be described in more detail in the following, reference being made to the accompanying drawings, in which.

DETAILED DISCLOSURE

Figure 1:
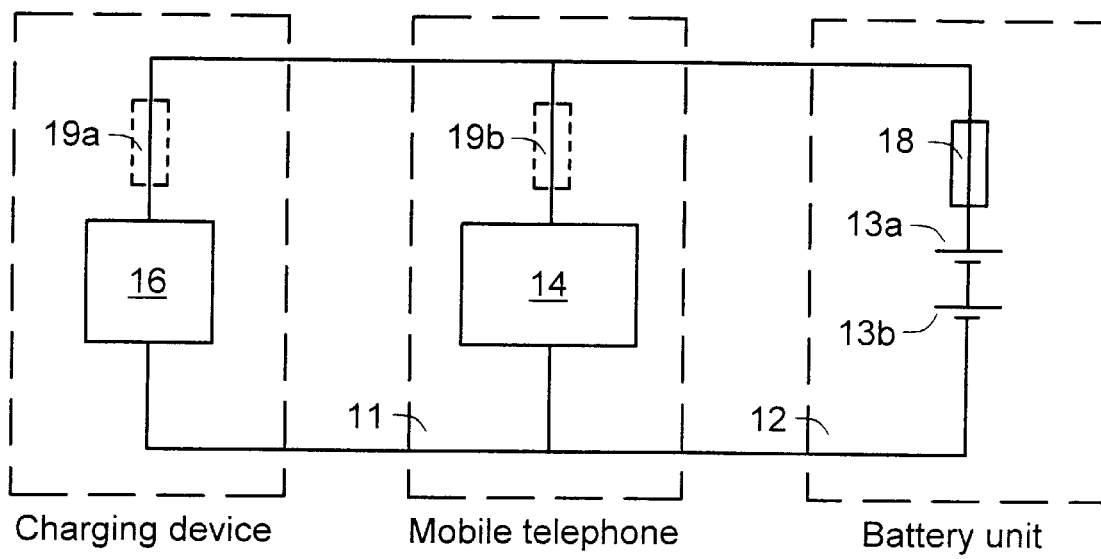
FIG. 1 is a schematic block diagram of a known charging arrangement for a mobile telephone, FIG. 2 discloses a known fuse, which is used in the arrangement according to FIG. 1.
Figure 2:
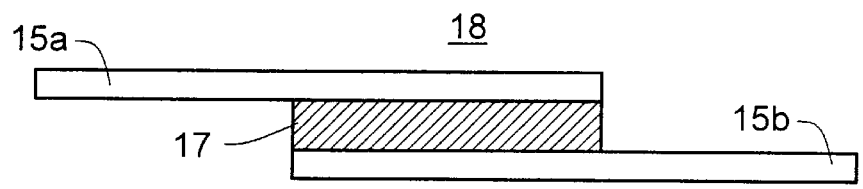

As previously mentioned, a known charging arrangement is shown in FIGS. 1 and 2 as well as an example of a fuse used therein.

Figure 3:
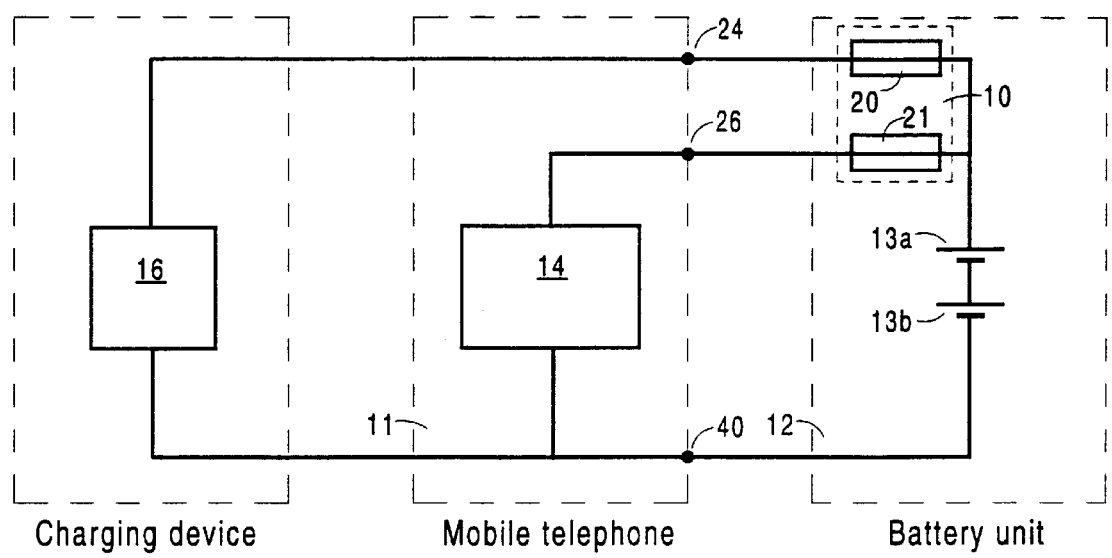
FIG. 3 is a schematic block diagram of a charging arrangement for a mobile telephone, in which the safety device according to the invention is used.

In FIG. 3 a charging arrangement is shown, wherein a safety device 10 according to a preferred embodiment of the present invention is used. As in FIG. 1, a charging device 16 is arranged to supply charging current to a battery unit 12 attached to a mobile telephone 11 for charging the battery unit. The charging device 16 and the mobile telephone 11 with its electronic components 14 are essentially identical to the ones already described with reference to FIG. 1, and hence the disclosure thereof is not repeated.

The battery unit 12 comprises a plurality—here: two—of battery cells 13a, 13b of an arbitrary type (such as NiMH, Li-type or NiCd), said cells being connected in series so as to provide a sufficient level of an external supply voltage for driving the electronic components 14. A difference compared to FIG. 1 is that the battery unit 12 is now provided with three terminals: a negative terminal, a first positive terminal and a second positive terminal. The first positive terminal is protected by a first fuse means 20 and is arranged to be connected to a first (positive) terminal 24 of the mobile telephone 11, while the second positive terminal is protected by a second fuse means 21 and is arranged to be connected to a second (positive) terminal 26 of the mobile telephone. Finally, the negative terminal is arranged to be connected to a third (negative or ground) terminal 40 of the mobile telephone 11.

The battery unit 12 is arranged to receive charging current from the charging device via the terminal 24. In addition, the battery unit is arranged to supply charging current to the mobile telephone 11 through the terminal 26. The following advantages are obtained thanks to the inventive arrangement of terminals and fuse means described above.

If the charging device 16 no longer operates normally but instead supplies an excessively strong charging current, or is subject to a short circuit, only the first fuse means 20 will release. This will abort the charging, but the second fuse means 21 will still be operative, wherein the power supply of the mobile telephone will not be affected.

The need for an additional fuse 19a in the charging device 16 or an additional fuse 19b in the mobile telephone 11 (see FIG. 1) is eliminated thereby providing an advantage from an economical point of view.

The arrangement above allows the two fuse means to be realized as an integrated safety device 10, which will be closer described below with reference to FIG. 4.

Figure 4:
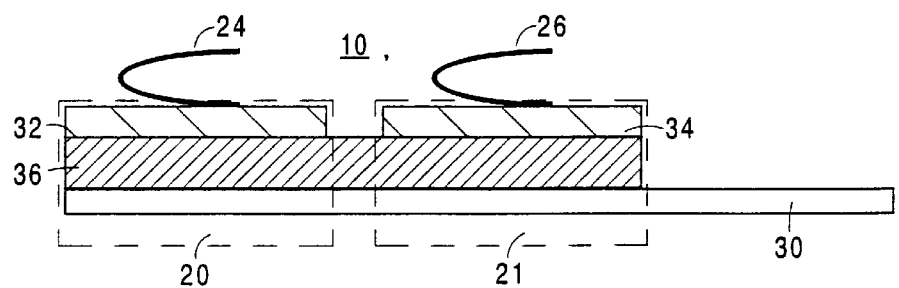
FIG. 4 illustrates one embodiment of the safety device according to the invention, as disclosed in FIG. 3.

In FIG. 4 a preferred embodiment of the safety device 10 according to the invention is shown. A thin layer of an active material 36 is deposited on a metallic contact tab 30, which is arranged to be connected in series with the battery cells 13a–b by means of soldering, laser or spot welding, etc. The active material 36 is a polymeric material, comprising thin fibres of carbon or another conductive material, said fibres normally conducting electric current but will separate in space and interrupt the current path, once the magnitude of the current increases as a result of an electric fault (cf. the description above with reference to FIG. 2). Hence, the material 36 is active in that the status thereof as a conductor of electric current is dependent on a physical property—in this case the current magnitude indirectly via the temperature of the material. The active material is known per se in the technical field, and hence a thorough disclosure will not be necessary here.

Two contact plates 32 and 34, respectively, are arranged upon the layer of active material 36. Preferably, these are made from metal and are provided with a smooth upper surface suitable for engagement with the corresponding terminals 24 and 26 in the mobile telephone 11. In the drawing the terminals 24 and 26 are formed as spring contacts, which are arranged to be resiliently pressed against a respective contact 32 and 34 in the safety device 10.

By providing the safety device 10 with double safety functions on the same substrate according to the preferred embodiment the problems described above are solved in an efficient way with respect to cost as well as space. Since the safety device is automatically resetable, the battery unit requires no maintenance in this respect.

Figure 5:
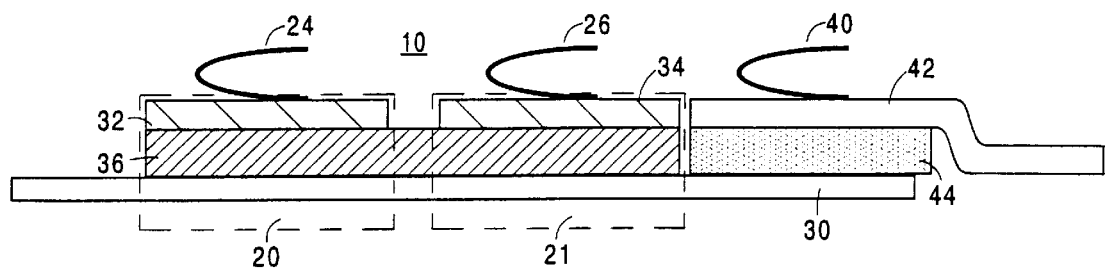
FIG. 5 illustrates an alternative embodiment of the safety device in FIG. 3.

FIG. 5 illustrates an improvement of the embodiment shown in FIG. 4. Components which are identical in FIG. 4 and FIG. 5 have been given identical reference numerals in both figures. The safety device 10 according to FIG. 5 has been provided with an additional contact means 42, which is arranged on an electrically isolating layer 44. The layer 44 is arranged on the contact tab 30, and so is the layer 36 of active material. The contact means 42 has a smooth upper surface for the reception of a third resilient contact means 40 in the mobile telephone 11. The contact means 42 is arranged to be soldered, welded or in any other way connected to the negative side of the battery cells 13a–b, while the contact tab 30 as before is arranged to be connected to the positive side of the battery cells.

Within the scope of the invention, as defined in the subsequent patent claims, the safety device may be realized in other ways than the ones described above, which should be readily realized by a man skilled in the art. For instance, instead of the active polymeric material, an arrangement with bimetallic elements may be used. Furthermore, the safety device does not necessarily have to be automatically resetable, although such a feature is regarded to be appropriate. Finally it is noticed once again, that the invention may be used together with electric equipment other than mobile telephones.

What is claimed is:

1. A safety device for a portable battery-powered electric apparatus having a battery unit with at least one battery cell for supplying power to electric circuitry in the apparatus, the electric apparatus being arranged to be connected to a charging device for charging the battery unit while maintaining the supply of power to the electric apparatus, comprising:

a first fuse arranged to be connected between the battery unit and a first terminal of the electric apparatus for receiving charging current from the charging device, and a second fuse arranged to be connected between the battery unit and a second terminal of the electric apparatus for supplying power to electric circuitry in the electric apparatus, wherein the first and second fuses are operatively independent of each other, particularly in that the second fuse can maintain an electric connection between the battery unit and the electric circuitry in the apparatus even if the first fuse opens in response to an undesired condition in the charging device.

2. The safety device of claim 1, wherein the first and second fuses are physically integrated.

3. The safety device of claim 1, wherein the first and second fuses are formed as layers of a material that is active with respect to at least one physical property, the layers are arranged between a contact tab and a first contact and a second contact, respectively, the contact tab is arranged to be connected to the battery unit, the first contact is arranged to be connected to the first terminal, and the second contact is arranged to be connected to the second terminal.

4. The safety device of claim 3, wherein an electrical conductivity of the material in a direction between the contact tab and the first and second contacts, respectively, is substantially zero when a temperature of the material exceeds a predetermined upper threshold value and returns to a non-zero value when the temperature of the material falls below a predetermined lower threshold value.

5. The safety device of claim 3, wherein the first and second contacts have planar upper surfaces for receiving a respective resilient contact of the electric apparatus.

6. The safety device of claim 5, wherein a third contact is mounted on the contact tab by an intermediate layer of an electrically isolating material, which has a planar upper surface for receiving a third resilient contact of the electric apparatus, and which is arranged to be connected to a negative side of the battery unit while the contact tab is arranged to be connected to a positive side of the battery unit.

7. The safety device of claim 1, wherein the electric apparatus is a mobile telephone for a cellular mobile telephone system.

8. A rechargeable battery unit having at least one battery cell for supplying power to a portable electric apparatus, wherein the battery unit comprises a safety device according to claim 1.

* * * * *